United States Patent
Park (10) Patent No.: US 7,844,818 B2
(45) Date of Patent: Nov. 30, 2010

(54) AUTHENTICATION APPARATUS AND METHOD FOR HOME NETWORK DEVICES

(75) Inventor: Sung-joon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1425 days.

(21) Appl. No.: 11/029,512

(22) Filed: Jan. 6, 2005

(65) Prior Publication Data

US 2005/0149758 A1 Jul. 7, 2005

(30) Foreign Application Priority Data

Jan. 6, 2004 (KR) .................. 10-2004-0000551

(51) Int. Cl.
H04L 9/08 (2006.01)
H04L 9/16 (2006.01)

(52) U.S. Cl. ...................... 713/168; 713/170

(58) Field of Classification Search ............... 713/171, 713/168, 170, 169; 380/44, 277; 726/5, 726/10
See application file for complete search history.

(56) References Cited

U.S. PATENT DOCUMENTS

| | | | | |
|---|---|---|---|---|
| 5,729,608 | A * | 3/1998 | Janson et al. | 713/171 |
| 6,665,530 | B1 * | 12/2003 | Broyles et al. | 455/411 |
| 6,735,619 | B1 * | 5/2004 | Sawada | 709/212 |
| 7,013,389 | B1 * | 3/2006 | Srivastava et al. | 713/163 |
| 2003/0084296 | A1 * | 5/2003 | Kyojima et al. | 713/171 |
| 2004/0006713 | A1 * | 1/2004 | Minemura | 713/201 |
| 2004/0010688 | A1 * | 1/2004 | Matsuzaki et al. | 713/169 |
| 2004/0064693 | A1 * | 4/2004 | Pabla et al. | 713/168 |
| 2004/0078571 | A1 * | 4/2004 | Haverinen | 713/168 |
| 2004/0107344 | A1 * | 6/2004 | Minemura et al. | 713/171 |

FOREIGN PATENT DOCUMENTS

| | | |
|---|---|---|
| JP | 62-290956 | 12/1987 |
| JP | 2000-349803 A | 12/2000 |
| JP | 2001-092718 A | 4/2001 |
| JP | 2002-271309 A | 9/2002 |
| JP | 2003-11170 A | 4/2003 |
| JP | 2003-303174 A | 10/2003 |
| KR | 2003-0034680 A | 5/2003 |
| WO | 02/076060 A2 | 9/2002 |
| WO | 02/080448 A1 | 10/2002 |
| WO | 03/079205 A1 | 9/2003 |

* cited by examiner

*Primary Examiner*—Gilberto Barron, Jr.
*Assistant Examiner*—Izunna Okeke
(74) *Attorney, Agent, or Firm*—Sughrue Mion, PLLC (57) ABSTRACT

An authentication method in a home network having at least one communicatable device and a home server which controls the devices, in which the home server authenticates the devices forming the home network. The home server generates the authentication key using the stored unique information of the home network device, and sends the generated authentication key together with the unique information to the device. The home server compares the operation value with respect to the generated authentication key and the unique information with the value received from the device, and completes the authentication when the two values are the same.

7 Claims, 5 Drawing Sheets

AUTHENTICATION APPARATUS AND METHOD FOR HOME NETWORK DEVICES

CROSS-REFERENCE TO RELATED APPLICATIONS

This application claims the benefit of Korean Patent Application No. 2004-551, filed on Jan. 6, 2004 in the Korean Intellectual Property Office, the disclosure of which is incorporated herein by reference in its entirety.

BACKGROUND OF THE INVENTION

1. Field of the Invention

The present invention is related generally to an apparatus and method for authenticating devices forming a network. More specifically, the present invention is directed to an apparatus and method for authenticating devices forming a network by use of a hash function.

2. Description of the Related Art

In conventional networks, a single server controls a plurality of devices forming the network. This network requires a security guarantee as, without such a guarantee, personal information may be revealed to others. Various algorithms of distinctiveness have been proposed to implement the security requirements. These algorithms have to ensure specific requirements as below:

Confidentiality: Confidentiality refers to restricting access to a message. Only one who knows a key used for encryption of data can obtain access to data using a cryptographic algorithm.

Integrity: Integrity refers to assuring that a received message is not modified by a third party during the delivery. A recipient can confirm the integrity of the message using a hash algorithm or a cipher system.

Authentication: Authentication refers to verification of a sender or recipient of a message, that is, a sender or a recipient verifies the other party. The authentication can be implemented using an authentication protocol based on the cipher system.

Non-repudiation: Non-repudiation refers to prevention of future denial of data transmission or reception by the sender or the recipient. If the sender transmits a certain message to the recipient, the sender cannot deny the transmission of the certain message and/or the recipient cannot insist on the reception of a certain message which the sender did not transmit.

The various algorithms provide sufficient stability and satisfy the above requirements. Thus, appropriate utilization of the algorithms can address problems in the network to some degree. Several cryptographic algorithms are described below, which ensure the above security requirements.

A secret key cryptographic algorithm, which is also called a symmetric cryptographic algorithm, uses the same keys for both encryption and decryption of data. The encryption key encrypts data, and the decryption key transforms the ciphertext into an original form. The sender and the recipient in the communication share a single key, and encrypts or decrypts using the key.

A public key cryptographic algorithm, which is also called an asymmetric cryptographic algorithm, uses different encryption and decryption keys. The encryption key is made public while the decryption key is kept secret so that it is infeasible to decrypt the ciphertext to the original form. The encryption key is referred to as the public key, and the decryption key is referred to as a private key. When using the public key cryptographic algorithm, the public key is revealed to others.

A hash algorithm, which is a one-way function, computes a function value using a variable. That is, it is easy to compute $f(x)$ for a given x but it is infeasible to compute x from $f(x)=0$. The one-way function is essential to the public key encryption. Though not a protocol per se, the one-way function is the basis of general security protocol implementations, especially, digital signature protocol implementation. Hence, the hash algorithm is one of critical technologies for the cipher system, together with the symmetric and public key cryptographic systems. The hash algorithm transforms an input value of a variable length into an output value of a fixed length. The output value is called a hash value or a message digest. The hash algorithm has to satisfy three requirements as below:

1) computationally infeasible to estimate the original input value using the hash value.

2) computationally infeasible to acquire another input value corresponding to the hash value when the input value and the corresponding hash value are given.

3) computationally infeasible to find two different input values for one hash value.

The authentication of the cryptographic algorithm is described in detail. The cryptographic algorithm uses three authentication methods, that is, it verifies information of a user, belongings of a user, and a property of a user. The user information is verified using a password. The belongings are verified using a certificate and a smart card. The user property is verified using a biometrics (for example, fingerprint and retina scannings). The authentication using the password includes a basic authentication and a digest authentication. The basic authentication verifies a client through a user identification (ID) and the password. The digest authentication may be utilized to authenticate the user while addressing drawbacks of the basic authentication in presenting the password.

Figure 1:
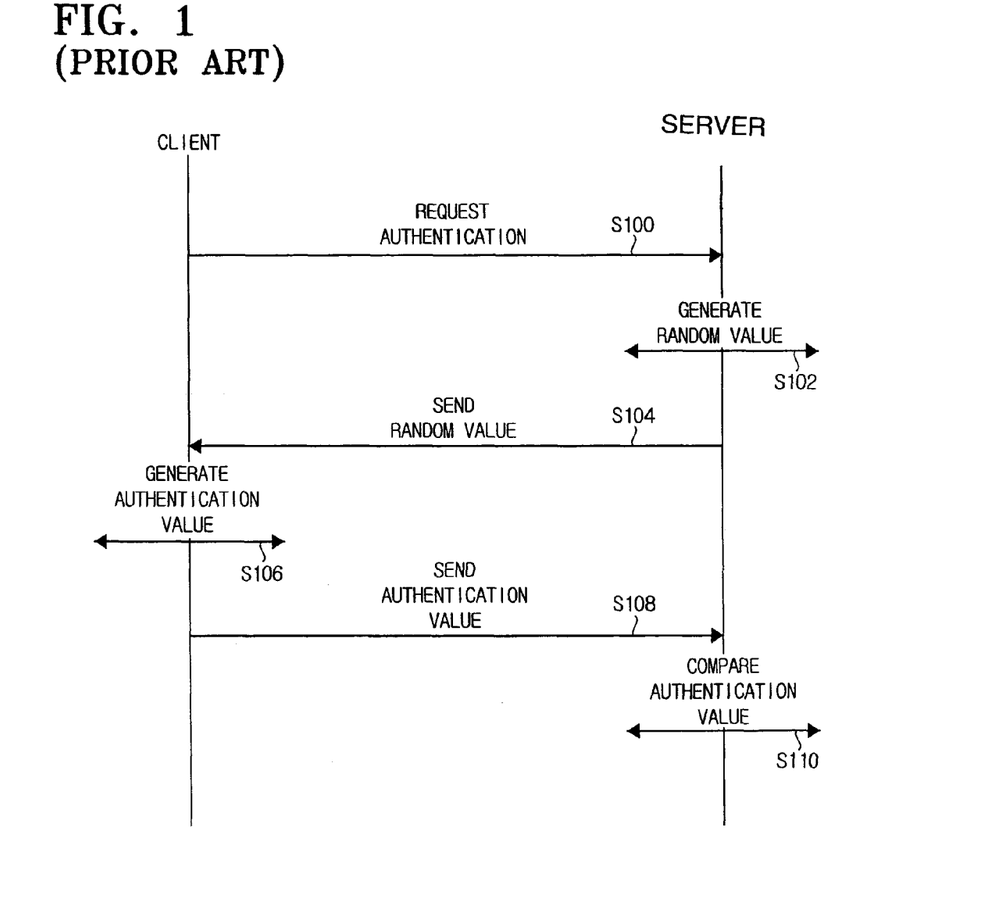
FIG. 1 is a diagram illustrating a conventional authentication between a client and a server according to a digest authentication method.

FIG. 1 illustrates authentication steps between a client and a server according to the digest authentication. The client requests the authentication to the server at step S100. The server generates a random value corresponding to the request of the client at step S102, and transfers the generated random value to the client at step S104. The client generates an authentication value using the received random value and a password at step S106. The client transfers the generated authentication value to the server at step S108. The server authenticates the client by comparing the received authentication value with its generated authentication value at step S110. In general, the authentication value is generated using the hash function.

As explained in the foregoing, the authentication is performed between the server and devices to assure the network reliability. Home network devices also need the authentication from the server. However, suitable authentication is not provided in current network environment. In general, additional expenses are needed to obtain unique authentication and server authentication certificates for the home network devices. Particularly, manufactures have to bear the additional cost for the certificate and for the unique authentication for each device to apply the certificates to the home network.

Accordingly, a new method is demanded for the authentication between the server and the devices without incurring the additional expenses.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

To address the above problems of the conventional arrangement, an exemplary aspect of the present invention is to provide an authentication method suitable to a home network environment.

Another exemplary aspect of the present invention is to provide an efficient authentication method capable of assuring a minimum security with respect to home network devices.

Still another exemplary aspect of the present invention is to provide an authentication method having minimum operations in consideration of performance of home network devices.

Yet another exemplary aspect of the present invention is to provide a method for efficient management of a plurality of devices.

To achieve the above aspects and features of the present invention, one exemplary embodiment of the present invention, as defined by the claims, provides an authentication method in a home network having at least one communicatable device and a home server which controls the at least one communicatable device, in which the home server authenticates the at least one communicatable device forming the home network, the authentication method including generating an authentication key from unique information stored on the at least one communicatable device, generating an authentication value using the unique information, sending the generated authentication key together with the unique information to the at least one communicatable device, comparing the authentication value with a value received from the at least one communicatable device, and completing the authentication for the device when the authentication value is the same with the value received from the at least one communicatable device.

Another exemplary embodiment of the present invention provides an authentication method in a home network having at least one communicatable device and a home server which controls the at least one communicatable device, in which the home server performs authentication requested by the at least one device forming the home network, the authentication method includes generating an authentication value from an authentication key extracted from information received from the home server and a stored unique information of the device, and sending the generated authentication value to the home server and receiving an information of an authentication result from the home server.

Still another embodiment of the present invention provides an authentication apparatus in a home network having at least one communicatable device and a home server which controls the devices, in which the home server authenticates the at least one device forming the home network, the authentication apparatus includes a device authentication value generator generating an authentication value using a stored unique information of the at least one communicatable device, an authentication key message generator generating an authentication message containing the authentication value to be sent to the at least one communicatable device, an authentication key using the unique information, and the unique information, and a device authenticator comparing the authentication value with a value received from the device.

BRIEF DESCRIPTION OF THE DRAWING FIGURES

These and/or other aspects and advantages of the invention will become apparent and more readily appreciated from the following description of the non-limiting, exemplary embodiments, taken in conjunction with the accompanying drawing figures of which.

DETAILED DESCRIPTION OF THE NON-LIMITING, EXEMPLARY EMBODIMENTS

Reference will now be made in detail to the embodiments of the present invention, examples of which are illustrated in the accompanying drawing figures, wherein like reference numerals refer to the like elements throughout. The embodiments are described below in order to explain the present invention by referring to the drawing figures.

Figure 2:
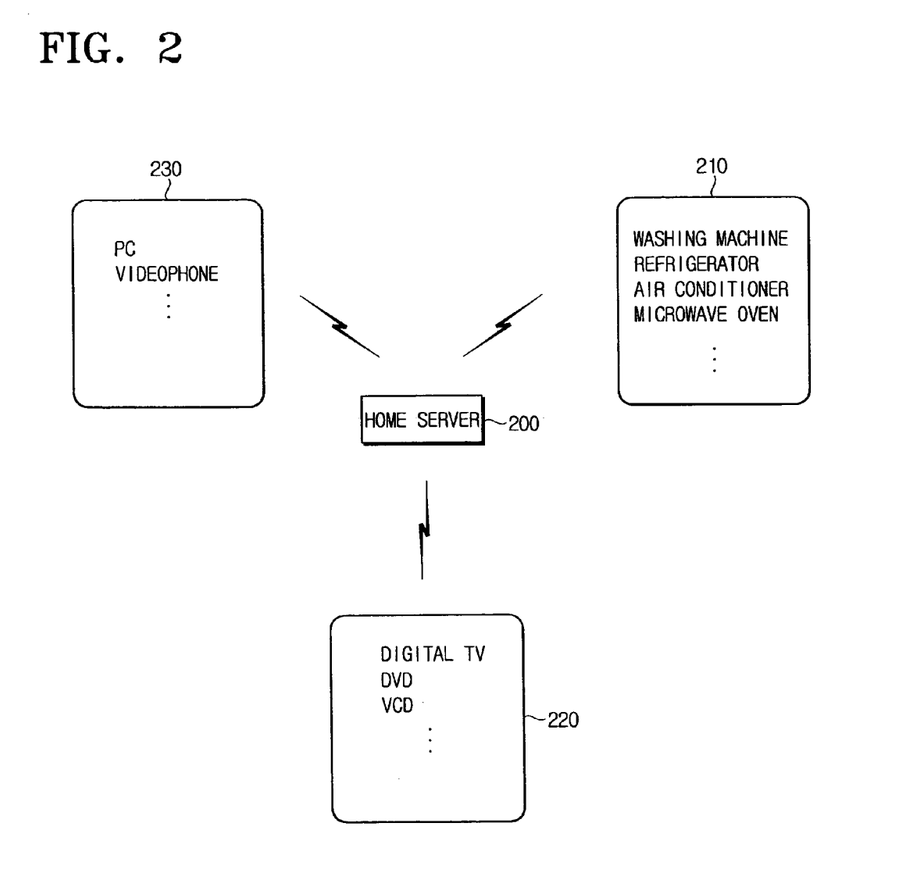
FIG. 2 is a diagram illustrating devices forming a home network according to an embodiment of the present invention.

FIG. 2 illustrates devices forming a home network according to an embodiment of the present invention. Referring to FIG. 2, the home network includes a plurality of devices and a home server 200 (or a gateway). The home server 200 manages and controls the devices. The devices may include advanced digitized appliances such as an audio/video (AV), a personal computer (PC), and a refrigerator, that can communicate with one another through wired or wireless networks. The devices are assigned an internet protocol (IP) address, and are connected to an internet. The devices may be able to voice-operate by adopting voice recognition and voice synthesis technologies.

Still referring to FIG. 2, the home network devices are managed by grouping into at least two groups. Specifically, devices having a similar function are grouped so as to provide a user with convenience. A living group 210, an AV group 220, and a PC group 230 are illustrated in FIG. 2. The living group 210 includes a refrigerator, a washing machine, an air conditioner, a microwave oven, etc. The AV group 220 includes a digital television, a digital video disc (DVD), a video compact disc (VCD), etc. The PC group 230 includes a PC, a videophone, etc.

Figure 3:
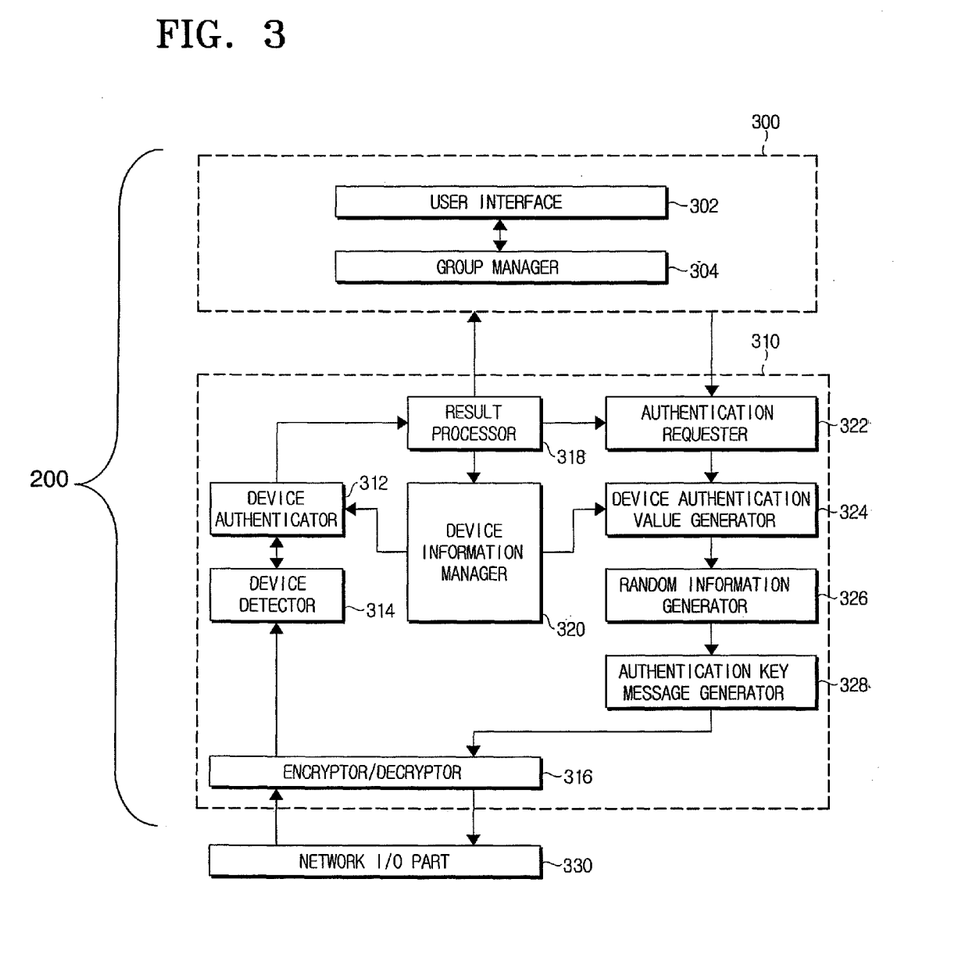
FIG. 3 is a block diagram illustrating a home server according to an embodiment of the present invention.

FIG. 3 illustrates a structure of the home server 200 according to an embodiment of the present invention. The home server 200 includes controller 300, a processor 310, and a network input/output (I/O) part 330. The controller 300 includes a user interface 302 and a group manager 304. The processor 310 includes a device authenticator 312, a device detector 314, an authentication key message generator 328, a random information generator 326, a device authentication value generator 324, an authentication requester 322, a result processor 318, a device information manager 320, an encryptor and decryptor 316.

The user interface 302 is input with a value for the device management from a user. The group manager 304 generates an ID and a group identifier for each device. The group identifier is used to manage the home network devices by the group.

The device detector 314 extracts a certain device which transmits packets, an authentication value, and an authentication information from the packets received from the network I/O part 330, and delivers the extracted information to the device authenticator 312. The device authenticator 312 compares the information, especially, the authentication value received from the device detector 314 with an authentication value which is generated using authentication information contained in the device information manager 320, so as to verify the authenticity of the certain device. The device authenticator 312 delivers the authentication result to the result processor 318.

Upon receiving the authentication result value of the certain device, the result processor 318 generates an authentication confirm message when the authenticity is verified. The generated authentication confirm message is delivered to the controller 300 and the device information manager 320. If the authentication of the certain device fails, the result processor 318 generates and delivers an authentication failure message to the controller 300 and the authentication requester 322.

The authentication requester 322 generates a message for re-requesting the authentication when a new device is registered to the home server 200 or the authentication fails. The authentication requester 322 receives the device ID and the group identifier of the certain device from the group manager 304. The device authentication value generator 324 generates a value for verifying the authentication of the certain device. The random information generator 326 generates a random information transmitted from the home server 200 to the certain device. The certain device generates an authentication value containing the random information to prevent the re-use of the same authentication value.

The authentication key message generator 328 will be described later. The encryptor and decryptor 316 selectively perform the encryption and the decryption depending on performance of the certain device. Particularly, the encryptor and decryptor 316 may or may not perform the encryption or the decryption on an authentication key message using a device secret key. The device information manager 320 stores information on the home network devices, such as a device type, the device ID, the group identifier, a device address, and the device secret key. The device secret key may be a serial number allocated to the certain device by a manufacturer. Exemplary information stored in the device information manager 320 is shown in Table 1.

TABLE 1

| Device type | refrigerator | microwave oven | DVD | videophone |
|---|---|---|---|---|
| device ID | aaa | bbb | ccc | ddd |
| group identifier | AAA | AAA | BBB | CCC |
| device address | 123.234.567 | 234.234.123 | 234.56.789 | 789.035.245 |
| device secret key | 234-345-987 | 123-563-786 | 556-432-789 | 876-783-324 |

The network I/O part 330 includes various network interfaces supported by the home server 200.

Figure 4:
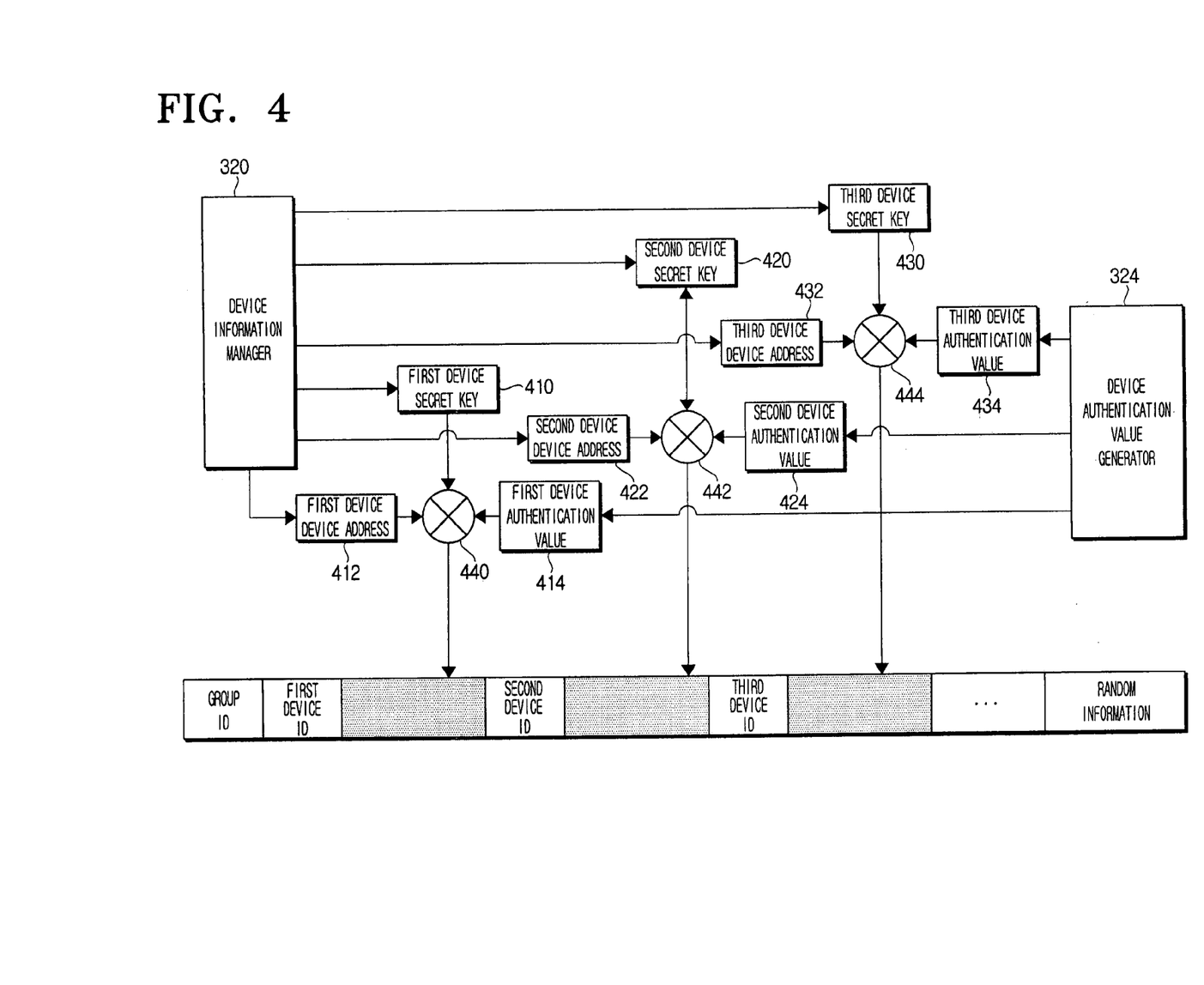
FIG. 4 is a diagram illustrating a generation and a structure of an authentication key according to an embodiment of the present invention.

FIG. 4 illustrates that the authentication key message is generated according to an embodiment of the present invention, in which the device information manager 320 and the device authentication value generator 324 are shown. The device information manager 320 outputs the stored device secret key and device address, and the device authentication value generator 324 outputs the generated device authentication value. The device authentication value generator 324 generates one device authentication value for each group so as to manage the home network devices by the group. Alternatively, a unique device authentication key may be generated for each device according to the user's setup.

The authentication key message generator 328 generates the authentication key message. It is assumed that the authentication key message generator 328 needs the authentication for first to third device. The authentication key message generator 328 receives a device secret key 410 and a device address 412 with respect to the first device from the device information manager 320 for the authentication of the first device. The authentication key message generator 328 receives a device authentication value 414 from the device authentication value generator 324 for the authentication of the first device. The received device secret key 410, the device address 412, and the device authentication value 414 are sent to an operator 440. The operator 440 performs exclusive OR operation using the received device secret key 410, the device information 412, and the device authentication value 414. The authentication key message generator 328 receives a device secret key 420 and a device address 422 with respect to the second device from the device information manager 320 for the authentication of the second device, and a device authentication value 424 generated by the device authentication value generator 324 for the authentication of the second device. The received device secret key 420, the device address 422, and the device authentication value 424 are sent to an operator 442. The operator 442 performs the exclusive OR operation using the received device secret key 420, the device address 422, and the device authentication value 424. The authentication key message generator 328 receives a device secret key 430 and a device address 432 with respect to the third device from the device information manager 320 for the authentication of the third device, and a device authentication value 434 generated by the device authentication value generator 324 for the authentication of the third device. The received device secret key 430, the device address 432, and the device authentication value 434 are sent to an operator 444. The operator 444 performs the exclusive OR operation using the received device secret key 430, the device address 432, and the device authentication value 434. The operators 440 to 444 perform the operations using the following Equation 1.

$$\text{device authentication key} = (\text{device secret key}) \text{XOR} (\text{device authentication value}) \text{XOR} (\text{device address}) \quad [\text{Equation 1}]$$

Device authentication keys generated in the operators 440 to 444 are appended to the authentication key message. The authentication key message contains the group identifiers, the device IDs, and the device authentication keys, and also contains the random information of the random information generator 326.

Figure 5:
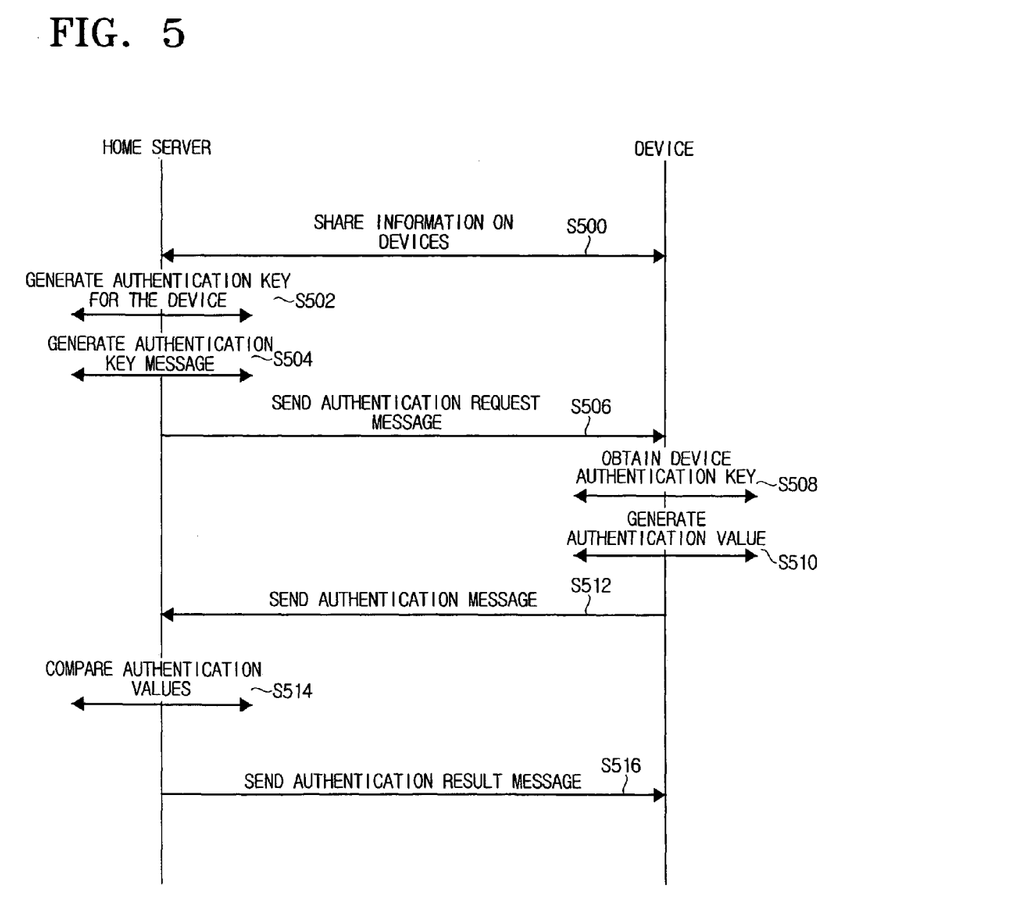
FIG. 5 is a message sequence chart illustrating exemplary authentication steps between the home server and the home network device according to an embodiment of the present invention.

FIG. 5 illustrates authentication steps between the home server and the home network device, which are described below in detail.

It is assumed that the device has the device secret key allocated by the manufacturer and that the allocated device secret key is shared with the home server. It is also assumed that the home server and the device share information relating to a type of the hash algorithm, an encryption support, and an encryption algorithm when the encryption is supported. When the encryption is not supported, the encryption algorithm information is unnecessary.

Referring to FIG. 5, the home server shares information on the device and the group identifier, the device ID, the device address, and the device secret key with respect to the devices at step S500. The home server recognizes the device secret key and the device address of the device using the sharing information. The group identifier is set in consideration of environment, position, and function of the device. Referring back to FIG. 2, the home network devices are grouped into the living group 210, the AV group 220, and the PC group 230.

The home server generates the authentication key for the device using the device secret key, the device address, and the device authentication value at step S502. The authentication key is generated as explained in the foregoing with reference to FIG. 4. Alternatively, the authentication key may be set directly by the user. The home server generates the authentication key message at step S504. The authentication key message contains the group identifier, the device ID, the device authentication key, and the random information. As described above, the device authentication key is generated through the exclusive OR operation using the device secret key, the device authentication value, and the device address.

The home server sends the generated authentication key message to the device at step S506. The authentication key message is called an authentication request message since the authentication key message may request the authentication for the device. The device generates its allocated device authentication key by use of the received authentication request message, and the stored device secret key and device address at step S508.

The device generates the authentication value through the hash algorithm using the generated device authentication key and the authentication information at step S510. The authentication information is shared by the home server and the device as aforementioned. The authentication information may contain the device address, the device secret key, and the random information. The device appends the generated authentication value to an authentication message, and sends the authentication message to the home server at step S512. The home server compares the received authentication value with the authentication value which is generated using the information stored in the device information manager 320 at step S514. If the two authentication values are the same, this indicates the authentication success, and if not, this indicates the authentication failure. The home server appends the authentication result into an authentication result message, and sends the authentication result message to the device at step S516. Though not illustrated in FIG. 5, the messages may be sent and received using a predetermined authentication key algorithm if the home network device supports the encryption.

In the light of the foregoing, the home server allots the authentication keys for the home network devices, thus reducing expenses. Even a memory-limited device can perform the authentication method using the above described methods. The user can conveniently manage the devices by the group.

While the exemplary, non-limiting embodiments of the present invention have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

What is claimed is:

1. An authentication method in a home network having at least one communicatable device and a home server which controls the at least one communicatable device, in which the home server authenticates the at least one communicatable device forming the home network, the authentication method comprising:

generating, by the home server, an authentication key from a stored unique information of the at least one communicatable device;

generating an authentication key message including an identifier and a group identifier of the at least one communicatable device, and random information on the generated authentication key;

sending the generated authentication key message together with the unique information to the at least one communicatable device;

comparing an authentication value with a value received from the at least one communicatable device; and completing the authentication for the device when the authentication value is the same with the value received from the at least one communicatable device, wherein the generating an authentication key generates the authentication key by performing an exclusive OR operation on an authentication value and the stored unique information, and wherein the authentication value is generated using a hash algorithm, and wherein the unique information includes serial number information set by a device manufacturer and an internet protocol (IP) address.

2. An authentication method in a home network having at least one communicatable device and a home server which controls the at least one communicatable device, in which the home server performs authentication requested by the at least one communicatable device forming the home network, the authentication method comprising:

generating, by the at least one communicatable device, an authentication value from an authentication key extracted from information received from the home server and a stored unique information of the at least one communicatable device;

sending the generated authentication value to the home server; and receiving an authentication result from the home server, wherein the generating the authentication value comprises extracting the authentication key by performing an exclusive OR operation on the information received from the home server and the unique information of the at least one communicatable device, wherein the authentication value is generated using a hash algorithm, and wherein the unique information includes serial number information set by a device manufacturer and an interne protocol (IP) address.

3. An authentication apparatus in a home network having at least one communicatable device and a home server which controls the at least one communicatable device, in which the home server authenticates the at least one communicatable device forming the home network, the authentication apparatus comprising:

a device authentication value generator generating an authentication value using a stored unique information of the at least one communicatable device;

an authentication key message generator generating an authentication message to be sent to the at least one communicatable device; and a device authenticator comparing the authentication value with a value received from the at least one communicatable device, wherein the authentication key message generator generates an authentication key message including an identifier and a group identifier of the at least one communicatable device, and random information on an authentication key which is generated by an exclusive OR operation on the authentication value and the stored unique information, wherein the device authenticator generates the authentication value from the authentication key and the unique information using a hash algorithm, and wherein the home server comprises a device information manager storing a serial number which is the unique information set by a device manufacturer, and an internet protocol address.

4. The authentication apparatus of claim 3, wherein the home server comprises an authentication requester generating a message for requesting the authentication of a device when the device joins the home network and needs the authentication.

5. The authentication apparatus of claim 3, further comprising a group manager allocating each device forming the home network into one of at least two groups, and storing an identifier of the allocated group and a device identification (ID).

6. The authentication apparatus of claim 5, wherein the device authentication value generator generates one authentication value with respect to devices in one group.

7. The authentication apparatus of claim 6, wherein the authentication key message generator generates the authentication key message containing the group identifier, device IDs of the devices in the group, and the authentication key with respect to each device.

\* \* \* \* \*